US012578713B2

(12) United States Patent
Sumiya et al.

(10) Patent No.: US 12,578,713 B2
(45) Date of Patent: Mar. 17, 2026

(54) RECYCLING SUPPORT SYSTEM

(71) Applicant: TOYOTA JIDOSHA KABUSHIKI KAISHA, Toyota (JP)

(72) Inventors: Tadayoshi Sumiya, Toyota (JP); Yasunobu Seki, Nisshin (JP); Koseki Sugiyama, Sunto-gun (JP); Yuto Kawata, Ichinomiya (JP); Hiroki Awano, Susono (JP); Kosuke Yonekawa, Nisshin (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 352 days.

(21) Appl. No.: 18/234,163

(22) Filed: Aug. 15, 2023

(65) Prior Publication Data

US 2024/0103502 A1 Mar. 28, 2024

(30) Foreign Application Priority Data

Sep. 22, 2022 (JP) ................................. 2022-150936

(51) Int. Cl.
G06Q 10/30 (2023.01)
G05B 19/418 (2006.01)

(52) U.S. Cl.
CPC ......... G05B 19/4188 (2013.01); G06Q 10/30 (2013.01); *G05B 2219/40034* (2013.01)

(58) Field of Classification Search
CPC ...... G05B 19/4188; G05B 2219/40034; G06Q 10/30; Y02E 50/10; H02J 3/003; H02J 3/144; H02J 7/0048; H02J 7/005; H02J 9/002; H02J 9/005; H02J 2310/50; H02J 2310/70
See application file for complete search history.

(56) References Cited

U.S. PATENT DOCUMENTS

| | | | | |
|---|---|---|---|---|
| 12,049,136 B2 * | 7/2024 | Yakes | ..................... | B60K 6/46 |
| 2009/0227003 A1 * | 9/2009 | Blotsky | ................... | C12P 7/649 |
| | | | | 210/603 |
| 2010/0233761 A1 * | 9/2010 | Czartoski | ................. | C12N 1/06 |
| | | | | 435/71.1 |
| 2012/0013474 A1 * | 1/2012 | Martinoli | .................. | G06F 1/28 |
| | | | | 340/636.1 |

FOREIGN PATENT DOCUMENTS

JP 2005-035967 A 2/2005

* cited by examiner

*Primary Examiner* — Alvin H Tan
(74) *Attorney, Agent, or Firm* — Oliff PLC

(57) ABSTRACT
A recycling support system for a production facility performing a plurality of types of recycling processing using marine plants includes a measurement unit configured to measure an amount of remaining energy used to operate the production facility, and a control unit configured to control a proportion of each of the plurality of types of recycling processing carried out in the production facility according to the amount of remaining energy used to operate the production facility measured by the measurement unit.

4 Claims, 2 Drawing Sheets

RECYCLING SUPPORT SYSTEM

CROSS REFERENCE TO RELATED APPLICATIONS

This application is based upon and claims the benefit of priority from Japanese patent application No. 2022-150936, filed on Sep. 22, 2022, the disclosure of which is incorporated herein in its entirety by reference.

BACKGROUND

The present disclosure relates to recycling support systems.

In recent years, there has been a demand for effective recycling of marine plants. Relevant techniques have been disclosed, for example, in Japanese Unexamined Patent Application Publication No. 2005-35967. Japanese Unexamined Patent Application Publication No. 2005-35967 discloses a marine plantation that produces methanol from seaweed.

SUMMARY

However, Japanese Unexamined Patent Application Publication No. 2005-35967 discloses that if an amount of remaining energy used to operate a production facility that produces methanol from seaweed is low, the production facility may stop operating halfway through the production of the methanol. For this reason, there has been a problem in Japanese Unexamined Patent Application Publication No. 2005-35967 that marine plants cannot be effectively recycled. This problem is particularly serious in production facilities and other facilities constructed at sea or other places where energy supply is difficult.

The present disclosure has been made in light of the above circumstances, and an object thereof is to provide a recycling support system that can effectively recycle marine plants.

A recycling support system according to the present disclosure for a production facility performing a plurality of types of recycling processing using marine plants includes: a measurement unit configured to measure an amount of remaining energy used to operate the production facility; and a control unit configured to control a proportion of each of the plurality of types of recycling processing carried out in the production facility according to the amount of remaining energy used to operate the production facility measured by the measurement unit. This recycling support system can effectively recycle marine plants, because the operation of the production facility can be prevented from being stopped halfway through the recycling processing by controlling the proportion of each of the plurality of types of recycling processing carried out in the production facility according to the amount of remaining energy used to operate the production facility.

According to the present disclosure, it is possible to provide a recycling support system that can effectively recycle marine plants.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

The present disclosure is described below through the embodiment of the disclosure, but the disclosure set forth in the claims is not limited to the following embodiment. Moreover, not all of the configurations described in the embodiment are essential as means to solve the problem. For clarity of explanation, the following descriptions and drawings have been omitted and simplified as appropriate. In each drawing, the same elements are marked with the same signs, and repeated descriptions have been omitted as necessary.

First Embodiment

Figure 1:
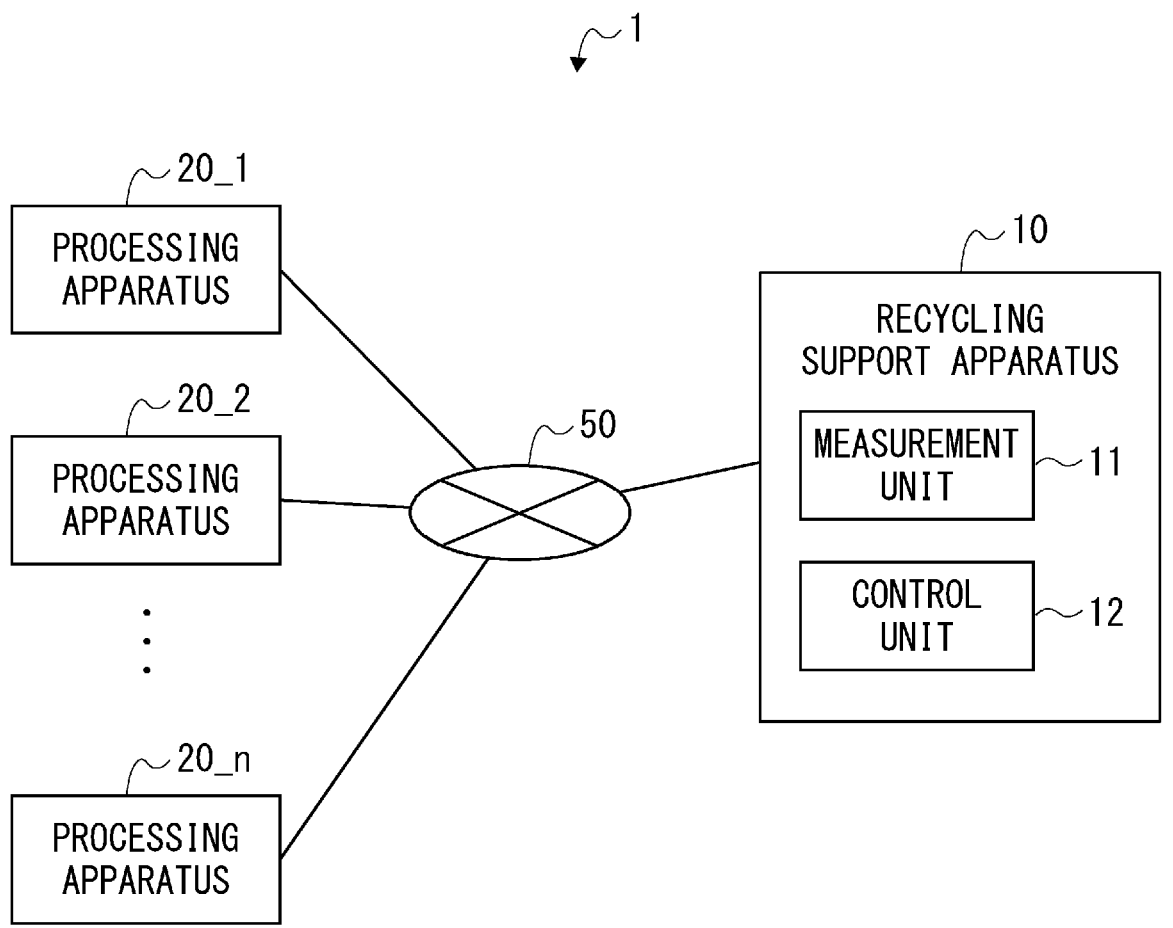
FIG. 1 is a block diagram showing an example of a configuration of a recycling support system according to a first embodiment.

FIG. 1 is a block diagram showing an example of a configuration of a recycling support system 1 according to a first embodiment. The recycling support system 1 according to this embodiment is utilized in a production facility constructed in a place where energy supply is difficult, for example at sea. Here, the recycling support system 1 according to this embodiment can effectively recycle marine plants, because an operation of the production facility can be prevented from being stopped halfway through recycling processing by controlling a proportion of each of a plurality of types of recycling processing carried out in the production facility according to an amount of remaining energy used to operate the production facility. Details of the recycling support system 1 according to this embodiment will be described below.

As shown in FIG. 1, the recycling support system 1 includes a recycling support apparatus 10, n (n is an integer of 2 or more) processing apparatuses 20_1 to 20_n, and a network 50. The recycling support apparatus 10 alone can also be referred to as a recycling support system. The recycling support apparatus 10 and the processing apparatuses 20_1 to 20_n are configured to be able to communicate with each other via a wired or wireless network 50.

The processing apparatuses 20_1 to 20_n are installed in a production facility constructed in a place where energy supply is difficult, for example at sea. Each of the processing apparatuses 20_1 to 20_n performs a different type of recycling processing. For example, the processing apparatus 20_1 performs processing to extract specific nutrients including magnesium, lithium, and alginate from marine plants such as seaweed. For example, the processing apparatuses 20_2 performs processing to dry marine plants for use in fertilizers such as bio-charcoal or as feed for livestock. For example, the processing apparatus 203 performs processing to ferment marine plants into ethanol. It should be noted that the processing to ferment marine plants into ethanol consumes more energy for the operation in the production facility than other processing.

The recycling support apparatus 10 controls a proportion of each of the plurality of types of the recycling processing that are performed in the production facility according to the amount of remaining energy used to operate the production facility.

Specifically, the recycling support apparatus 10 includes a measurement unit 11 and a control unit 12.

The measurement unit 11 measures the amount of remaining energy used to operate the production facility. For example, the measurement unit 11 measures, as the amount of remaining energy used to operate the production facility, at least either a remaining amount of fuel including gasoline or ethanol or a remaining amount of electricity accumulated in a storage battery. The storage battery stores, for example, electricity generated by solar panels or wind power (i.e., electricity from natural energy).

The control unit 12 controls the proportion of processing of each of the plurality of types of recycling processing carried out in the processing apparatuses 20_1 to 20_n in the production facility according to the amount of remaining energy used to operate the production facility measured by the measurement unit 11. For example, the control unit 12 stops the operation of any of the processing apparatuses 20_1 to 20_n when the amount of remaining energy used to operate the production facility becomes low. This prevents the operations of the remaining processing apparatuses in operation from being unintentionally stopped halfway through the recycling processing.

In this way, the recycling support system 1 according to this embodiment can effectively recycle marine plants, because an operation of the production facility can be prevented from being stopped halfway through recycling processing by controlling a proportion of each of a plurality of types of recycling processing carried out in the production facility according to an amount of remaining energy used to operate the production facility.

(Operation of Recycling Support System 1)

Figure 2:
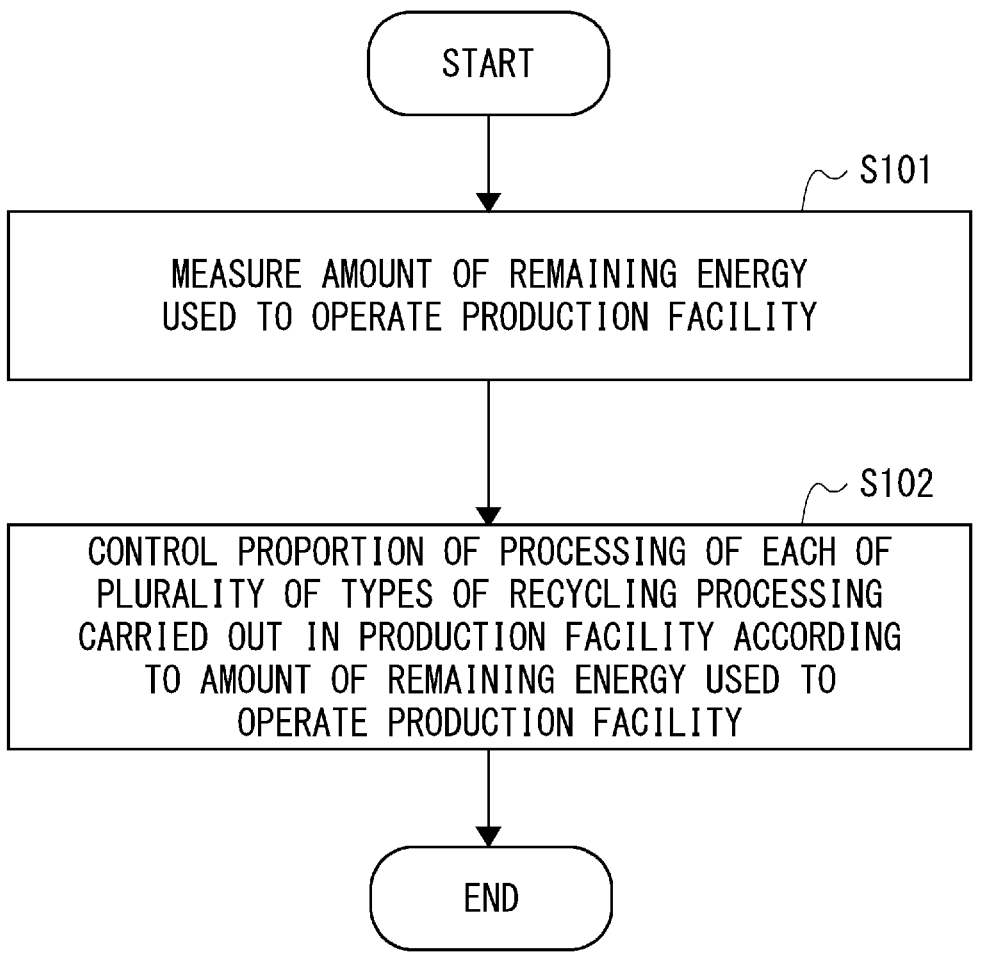
FIG. 2 is a flowchart showing an operation of the recycling support system shown in FIG. 1.

Next, an operation of the recycling support system 1 is described using FIG. 2. FIG. 2 is a flowchart showing the operation of the recycling support system 1.

In the recycling support system 1, the recycling support apparatus 10 first measures the amount of remaining energy used to operate the production facility (Step S101). After that, the recycling support apparatus 10 controls the proportion of processing of each of the plurality of types of recycling processing carried out in the processing apparatuses 20_1 to 20_n installed in the production facility according to the amount of remaining energy used to operate the production facility (Step S102).

For example, the recycling support apparatus 10 stops the operation of any of the processing apparatuses 20_1 to 20_n when the amount of remaining energy used to operate the production facility becomes low. This prevents the operations of the remaining processing apparatuses in operation from being unintentionally stopped halfway through the recycling processing. Alternatively, when the amount of remaining energy used to operate the production facility becomes low, for example, the recycling support apparatus 10 may reduce the proportion of processing of producing ethanol having high energy consumption and increase the proportion of another recycling processing having low energy consumption.

In this way, the recycling support system 1 according to this embodiment can effectively recycle marine plants, because the operation of the production facility can be prevented from being stopped halfway through the recycling processing by controlling the proportion of each of the plurality of types of recycling processing carried out in the production facility according to the amount of remaining energy used to operate the production facility.

The present disclosure is not limited to the above embodiment and can be changed as appropriate without departing from the scope thereof. The present disclosure promotes the use of blue carbon (seaweed) and contributes to the Sustainable Development Goals (SDGs) and carbon neutrality.

Moreover, the present disclosure can achieve part or all of the processing of the recycling support system 1 by causing a CPU (Central Processing Unit) to execute a computer program.

The above program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a RAM (Random-Access Memory), a ROM (Read-Only Memory), a flash memory, a SSD (Solid-State Drive) or other types of memory technologies, a CD-ROM, a DVD (Digital Versatile Disc), a Blu-ray disc (registered trademark) or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The whole or part of the example embodiments disclosed above can be described as, but not limited to, the following supplementary notes, (Supplementary Note 1)

A recycling support method for a production facility performing a plurality of types of recycling processing using marine plants, the recycling support method comprising:

measuring an amount of remaining energy used to operate the production facility; and controlling a proportion of each of the plurality of types of recycling processing carried out in the production facility according to the measured amount of remaining energy used to operate the production facility.

(Supplementary Note 2)

A control program for causing a computer to execute recycling support processing for a production facility performing a plurality of types of recycling processing using marine plants, the control program causing the computer to execute processing of:

measuring an amount of remaining energy used to operate the production facility; and controlling a proportion of each of the plurality of types of recycling processing carried out in the production facility according to the measured amount of remaining energy used to operate the production facility.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A recycling support system for a production facility performing a plurality of types of recycling processing using marine plants, the recycling support system comprising:

a measurement unit configured to measure an amount of remaining energy used to operate the production facility; and a control unit configured to control a proportion of each of the plurality of types of recycling processing carried out in the production facility according to the amount of remaining energy used to operate the production facility measured by the measurement unit, wherein when the amount of remaining energy used to operate the production facility is less than or equal to a predetermined amount of energy, the control unit reduces the proportion of the plurality of types of recycling processing having a processing time of a predetermined period of time or longer among the plurality of types of recycling processing.

2. The recycling support system according to claim 1, wherein the plurality of types of recycling processing at least includes processing of extracting specific nutrients from the marine plants, processing of drying the marine plants, and processing of fermenting the marine plants into ethanol.

3. The recycling support system according to claim 1, wherein the measurement unit measures the amount of remaining energy used to operate the production facility based on a stored amount of electricity obtained from natural energy.

4. The recycling support system according to claim 1, wherein the measurement unit measures the amount of remaining energy used to operate the production facility based on a remaining amount of fuel including gasoline or ethanol.

* * * * *